US011217108B1

(12) United States Patent
Barnett et al.

(10) Patent No.: US 11,217,108 B1
(45) Date of Patent: Jan. 4, 2022

(54) SYSTEM AND METHOD FOR PROVIDING GUIDANCE TO A USER OF A WEBSITE OR APPLICATION

(71) Applicant: Zoosk, Inc., San Francisco, CA (US)

(72) Inventors: Eric R. Barnett, Menlo Park, CA (US); Shayan G. Zadeh, San Francisco, CA (US); Joshua D. Royse, San Francisco, CA (US); Danielle Chandler, San Francisco, CA (US); Jared R. Crane, San Francisco, CA (US); Ryan Koziel, Huntington Beach, CA (US)

(73) Assignee: Zoosk, Inc., Lehi, UT (US)

( * ) Notice: Subject to any disclaimer, the term of this patent is extended or adjusted under 35 U.S.C. 154(b) by 485 days.

(21) Appl. No.: 15/920,376

(22) Filed: Mar. 13, 2018

Related U.S. Application Data

(63) Continuation of application No. 14/730,076, filed on Jun. 3, 2015, now Pat. No. 9,917,761.

(60) Provisional application No. 62/007,081, filed on Jun. 3, 2014.

(51) Int. Cl.
*G09B 5/00* (2006.01)
*G09B 7/00* (2006.01)
*H04L 29/08* (2006.01)

(52) U.S. Cl.
CPC ............... *G09B 5/00* (2013.01); *G09B 7/00* (2013.01); *H04L 67/306* (2013.01)

(58) Field of Classification Search
CPC .................................. G09B 7/00; G09B 5/00
See application file for complete search history.

(56) References Cited

U.S. PATENT DOCUMENTS

2016/0300252 A1* 10/2016 Frank ................ G06F 16/24578
2021/0133656 A1*  5/2021 Barbitta .................. H04L 51/18

* cited by examiner

*Primary Examiner* — Adnan M Mirza
(74) *Attorney, Agent, or Firm* — Innovation Partners; Charles E. Gotlieb

(57) ABSTRACT

A system and method assists a user in achieving one or more goals of the user or the operator of a web site, application or other media by comparing a series of two or more actions of a user to those of other users, and identifying whether a primary action has been requested or performed by the user, or determining if a first piece of information has been specified by the user as being in a first set, and a second piece of information has not been specified or has been specified in a non-committal manner, and then provides relevant information to the user to instruct the user how to perform the primary action or to notify the user of the consequences of not specifying the second piece of information or specifying it in a non-committal manner.

18 Claims, 5 Drawing Sheets

SYSTEM AND METHOD FOR PROVIDING GUIDANCE TO A USER OF A WEBSITE OR APPLICATION

RELATED APPLICATIONS

This application is a continuation of U.S. patent application Ser. No. 14/730,076, entitled, "System and Method for Providing Guidance to a User of a Website or Application" filed by on Jun. 3, 2015 by Shayan Zadeh, Josh Royse, Danielle Chandler, Jared Crane, Ryan Koziel and Eric Barnett, which claims the benefit of U.S. Provisional Patent Application Ser. No. 62/007,081 entitled, "Method and Apparatus for Providing Guidance to a User of a Website or Application" filed by Shayan Zadeh, Josh Royse, Danielle Chandler, Jared Crane, Ryan Koziel and Eric Barnett on Jun. 3, 2014, each having the same assignee as the present application and each is hereby incorporated by reference in its entirety.

FIELD OF THE INVENTION

The present invention is related to computer software and more specifically to computer software for providing guidance to a user, however it is related to other fields as well.

BACKGROUND OF THE INVENTION

Users who operate a web site or an application may provide commands to operate the web site or application. This arrangement is suboptimal. What is needed is a system and method that can assist a user in operating a web site or application.

Additionally, users may supply some, but not all, information to a website or an application. What is needed is a system and method to assist users in supplying information to a web site or application.

SUMMARY OF INVENTION

A system and method identifies one or more primary actions, actions a user may take to operate a web site or application, such as those that indicate the user is having a positive experience with the web site or application. For each primary action, a series of two or more actions are identified, that users who perform the primary action may take prior to performing the primary action for the first time. For at least one action in the series, a number of times the action is performed, without any performance of the primary action, is identified that indicates that the user may not be aware of the primary action or how to perform it. This number is considered a threshold, and may be identified by reviewing the number of times many other users have performed the action or actions in the series at the time they perform the first primary action, and then taking a percentile number of performances of the action or actions in the series at the time the first primary action is performed, such as the $40^{th}$, $50^{th}$ or $60^{th}$ percentile, or another similar measurement, such as the average number of performances of the one or more actions in the series at the time the other users perform the primary action for the first time. The threshold may apply to one or more types of actions in the series, and may be expressed as a function. Actions in the series may only trigger the threshold if they are performed in an order, or they may trigger the threshold if they are performed in any order.

The user's actions may be monitored and recorded, across multiple sessions, each session initiated by registration or logging in, in one embodiment. If the user has not performed the primary action when the threshold number of actions in the series are performed by the user, the user may be informed of the existence of the primary action and offered instructions on how to perform the primary action. The user may refuse, defer or accept the offer. If accepted, the user is provided with instructions for each of one or more activities that make up the primary action, and instruction for the next activity may be provided one at a time as the user performs each activity.

Additionally, a system and method checks two pieces of information (referred to as a pair) that can be supplied by a user of a web site or an application, to determine if information supplied as the first in the pair has content that causes the first in the pair to be in a set of possible information supplied, and has information in the second set or has information in the second set that is not noncommittal. If the information supplied in the first of the pair is within a set of less than all the possible information that may be supplied, but the user has not supplied information in the second of the pair, or has supplied information in the second of the pair that is non-committal, the user is requested to supply the second piece of information in the pair, and optionally notified that users who have provided the first piece of information in the manner they provided, have a higher probability of achieving one or more of their goals of using the web site or application if they supply an answer (or an answer that is not noncommittal) in the second piece of information. The two pieces of information are selected from those supplied by users, where users who supply the first piece, optionally within a subset of possible values, have a greater chance of achieving a goal of a user using the web site or application if they also supply the second piece of information or supply it with a non-committal value, where the second piece in the set may be optional or may allow a non-committal answer.

DETAILED DESCRIPTION OF A PREFERRED EMBODIMENT

Figure 1:
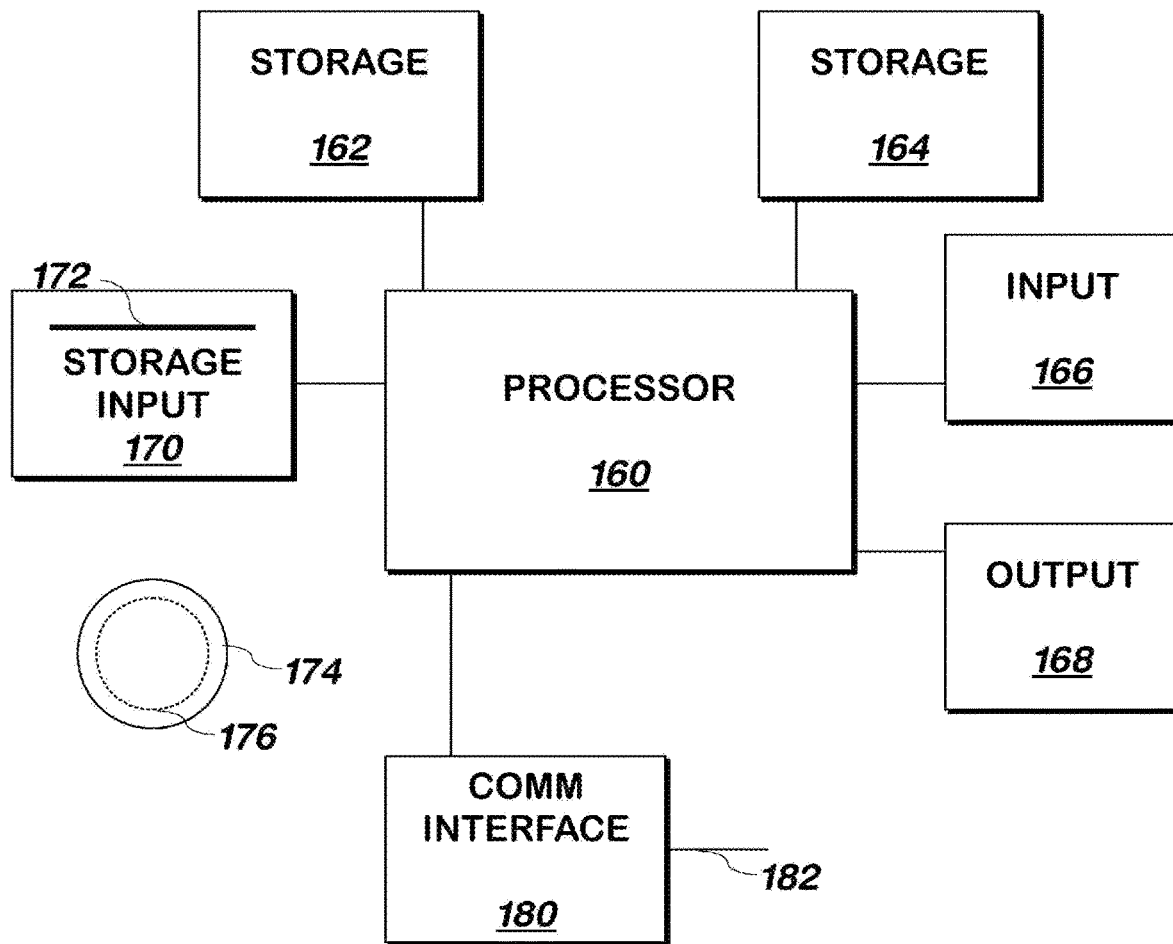
FIG. 1 is a block schematic diagram of a conventional computer system.

The present invention may be implemented as computer software on a conventional computer system, instructions embodied in a non-transitory computer media, or as a conventional computer system itself including a hardware processor coupled to a memory. Referring now to FIG. 1, a conventional computer system 150 for practicing the present invention is shown. Processor 160 retrieves and executes software instructions stored in storage 162 such as memory, which may be Random Access Memory (RAM) and may control other components to perform the present invention. Storage 162 may be used to store program instructions or data or both. Storage 164, such as a computer disk drive or other nonvolatile (i.e. non-transitory) storage, may provide storage of data or program instructions. In one embodiment, storage 164 provides longer term storage of instructions and data, with storage 162 providing storage for data or instructions that may only be required for a shorter time than that of storage 164. All storage elements described herein may include conventional memory and/or disk storage and may include a conventional database. All system elements may include a hardware processor system of one or more hardware processors coupled to a memory system of one or more magnetic, electronic or other storage devices. All elements of a system include any or all of at least one input, at least one output and at least one input/output. The only nonce word used herein is "means", all other terms associated with system claims are to be interpreted as structural.

Input device 166 such as a computer keyboard or mouse or both allows user input to the system 150. Output 168, such as a display or printer, allows the system to provide information such as instructions, data or other information to the user of the system 150. Storage input device 170 such as a conventional floppy disk drive or CD-ROM drive accepts via input 172 computer program products 174 such as a conventional floppy disk or CD-ROM or other nonvolatile storage media that may be used to transport computer instructions or data to the system 150. Computer program product 174 has encoded thereon computer readable program code devices 176, such as magnetic charges in the case of a floppy disk or optical encodings in the case of a CD-ROM which are encoded as program instructions, data or both to configure the computer system 150 to operate as described below.

In one embodiment, each computer system 150 is a conventional SUN MICROSYSTEMS T SERIES SERVER running the SOLARIS operating system commercially available from ORACLE CORPORATION of Redwood Shores, Calif., a PENTIUM-compatible personal computer system such as are available from DELL COMPUTER CORPORATION of Round Rock, Tex. running a version of the WINDOWS operating system (such as XP, VISTA, or 7) commercially available from MICROSOFT Corporation of Redmond Wash. or a Macintosh computer system running the MACOS or OPENSTEP operating system commercially available from APPLE INCORPORATED of Cupertino, Calif. and the FIREFOX browser commercially available from MOZILLA FOUNDATION of Mountain View, Calif. or INTERNET EXPLORER browser commercially available from MICROSOFT above, although other systems may be used. Each computer system 150 may be a SAMSUNG GALAXY NEXUS III commercially available from SAMSUNG ELECTRONICS GLOBAL of Seoul, Korea running the ANDROID operating system commercially available from GOOGLE, INC. of Mountain View, Calif. Various computer systems may be employed, with the various computer systems communicating with one another via the Internet, a conventional cellular telephone network, an Ethernet network, or all of these.

Figure 2:
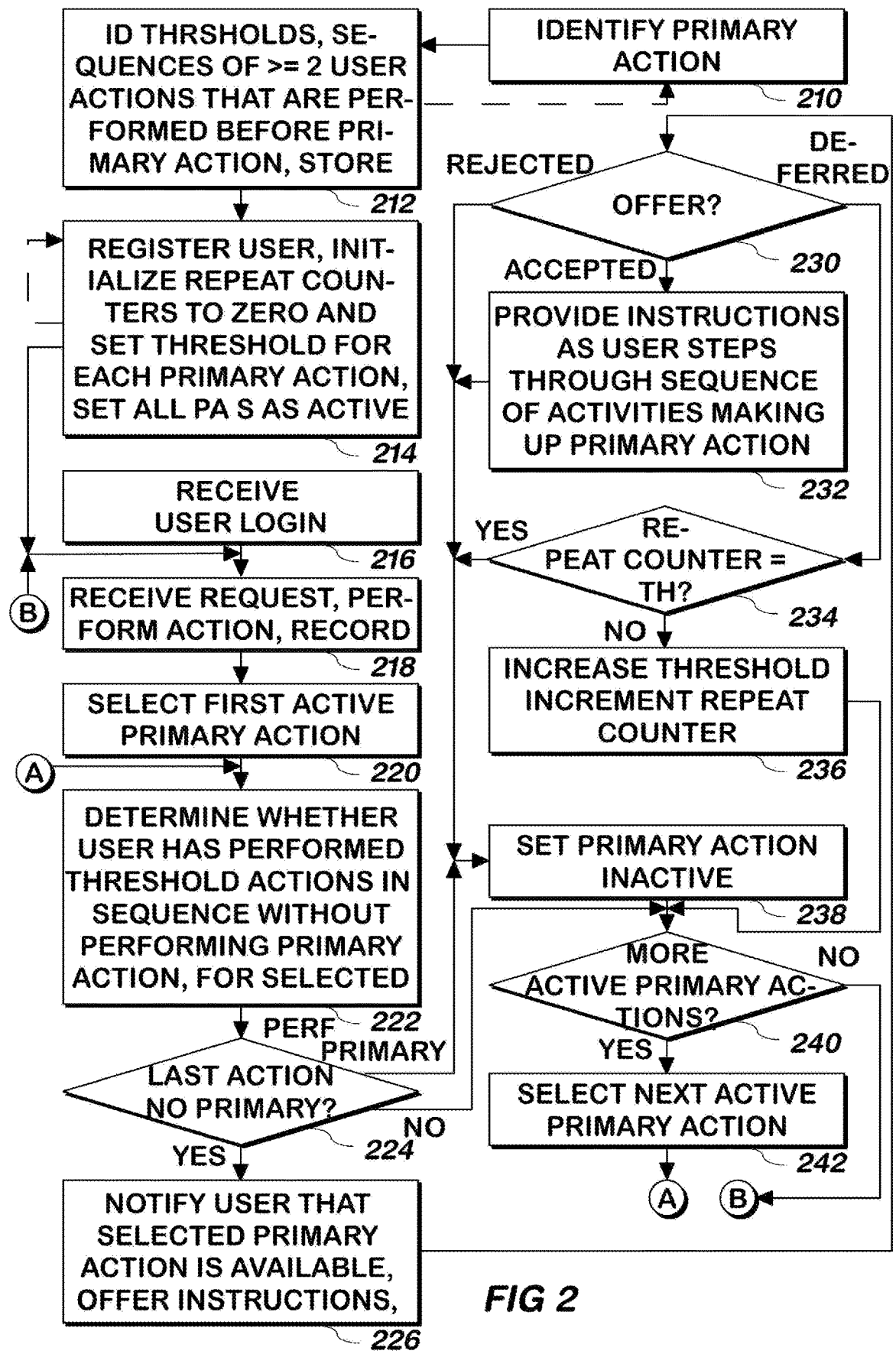
FIG. 2 is a flowchart illustrating a method of providing guidance to a user of a web site or application or other media according to one embodiment of the present invention.

Referring now to FIG. 2, a method of providing guidance to a user of a website or application or other media is shown according to one embodiment of the present invention.

An action a user can perform on a web site or application is identified as a primary action 210. The description below discusses actions on a web site, though the present invention can be used on any application or other media as well. In one embodiment, an action is identified as a primary action if the performance of the action indicates that the user is having a successful experience with the web site or otherwise achieving at least one goal the user has in using the web site or at least one goal of the operator of the web site. In one embodiment, a successful experience with the web site may be identified by those users who spend more time than the average on the web site per day, who are engaged with the web site for a longer than average period of time, or sign up for additional services, or paid services on the web site, which may also be goals of the operator of the web site. A user's goal in using the web site may be to receive messages from other users or receive replies from other users to messages that the user has sent. Thus, if it is found that users who e-mail other users have a more successful experience with the web site then users who do not e-mail other users, the action of e-mailing a user on the web site could be identified as at least one primary action. The primary action can be composed of several activities, such as filling in different fields of an e-mail message and then pressing a send button. Goals are described herein, but consequences may also be used instead or in addition to goals as used herein.

At least two user actions that are typically performed by a user before a user performs the primary action for the first time are identified 212. The two or more user actions are performed in a sequence, the order of which may be predictable or random, with two or more of the actions in the sequence typically being performed before the primary action is performed for the first time. The actions of the sequence need not be required to be performed before the user performs the primary action, but are typically performed before a user performs an action for the first time.

For example, on a dating website many users will browse profiles of the other users on the website, and then send a message to one or more such other users. In this example, the primary action is the sending of a message to another user. The sequence of user actions performed before the primary action is the registering of the user and browsing of profiles of the other users.

The sequence may contain not only multiple actions performed by the user, but also multiple types of actions performed by the user. For example, the sequence may include the user registering as a female, and then browsing a number of profiles, before sending a message as a user registered as a female, which is the primary action. A different sequence may include the user registering as a male, and then browsing a number of profiles, before sending a message as a user registered as a male, a different primary action.

Step 212 includes identifying a threshold number of actions in the sequence that can be used to determine that a user who has performed that many actions in the sequence without performing the corresponding primary action may not be sure of how to perform the primary action. Such number of actions may be identified by identifying the number of such actions performed by many other users at the time they perform the primary action for the first time. The average may be used in one embodiment. Other numbers may be used as the threshold in place of the average, for example using a 60th percentile, or a 40th percentile, or any other percentile. The number of profiles browsed in each of these two different sequences described above may be different, as the average number of browsing actions performed before a primary action is performed by a user for the first time, or the number of profiles browsed in the same percentile of browse actions performed before sending the first message for each sequence may be different from one another, while the number of times the user registers is always the same number, 1.

In one embodiment, an action required to be performed before the user can perform the primary action does not count towards the requirement of the number of actions in a sequence being greater than one. Additionally, in one embodiment, the performance of merely any activity that can be performed on a web site or in an application is not considered the performance of an activity in the series, as the series is defined as a specified subset of all such activities in one embodiment.

In one embodiment, if there are multiple types of actions in the sequence, the number of only one type of action may be used as the threshold, or the number of each of more than one type of action may be identified as the threshold, with either one, or both, thresholds to be met. In another embodiment, a function may be specified as the threshold, such as "the total number of times both types of actions have been performed are equal to N", allowing the performance of one type of action to be substituted for a different type, according to the function. Other types of functions may be used.

For example, to identify when a user who has browsed profiles (the sequence of actions) has typically sent a message to another user (the primary action), the number of profiles browsed by users at the time they sent their first message may be identified. The number of profiles browsed by many such users at the time they send their first message may be averaged to identify an expected number of profiles browsed by the user at the time a typical or average or certain percentile user sends a message to another user, and this number may be used as the threshold. A lower percentile than the $50^{th}$ may be used if it is believed that the average is distorted higher by users who waited to send their first message because they did not know how to send one, and a higher number may be used if it is believed that most users did not wait to send a message because of a lack of knowledge of how to do so, and it is desirable not to interrupt the user frequently to offer instructions.

The threshold can be different for different types of users, for example, based on user input as noted above. Persons who have identified themselves as male may have one threshold and persons identified as female may have another, with the thresholds identified as described above, but only using users who identified themselves as the same type of user, in one embodiment. Thresholds may be adjusted based on user-identified education level, or based on exhibited sophistication of the user, such as may be evidenced by their initial actions. For example, if the user performs one type of primary action far before the threshold with respect to the sequence, the thresholds for other primary actions may be increased.

Any number of primary actions may be identified, and the sequences of actions and threshold information for each primary action, such as a number or function, may be identified, and stored, as indicated by the dashed line in the Figure.

Conventional registration information for users is received, such as a user identifier and password, and certain values are initialized for the user 214. In one embodiment, a repeat counter, used as described below, is initialized for the user to zero for each primary action identified above, and the threshold or thresholds identified for each primary action identified in step 212 may be assigned to a threshold or thresholds for the user. All primary actions are defined as active. The purpose for each of these values is described in more detail below. The method continues at step 218.

After the session in which a user registers, the user may log in using conventional login techniques 216, such as supplying or making available a conventional user identifier and optionally a password, and the method continues at step 218. Thus, the method may be used across multiple sessions, with the threshold applicable to actions the user performs across one or more sessions.

At step 218, a request to perform an action is received by a server, which performs the action and records the performance of the action associated with the user identifier of the user who registered or logged in.

A first active primary action selected 220 from those identified as described above. A determination is made as to whether the user has performed, or caused to be performed, via multiple iterations of step 218, the threshold number or numbers of actions in the sequence of actions identified for the selected primary action without performing the selected primary action 222. There may be multiple types of actions in the sequence, with one such type of action having a threshold, and the others having no thresholds, or multiple types of actions may have thresholds, or there may only be one type of action, having a threshold of two or more.

In one embodiment, actions in the sequence must be performed in an order relative to one another in order to meet the threshold, such as by performing at least three actions of one type, then performing at least two actions of another type and then performing at least four actions of the first type. The threshold would be met upon the performance of all the specified actions in the order identified. If the user performs 7 actions of the first type, followed by two actions of the second type, the threshold would not be met until the user performed four actions of the first type following the performance of the two actions of the second type. In another embodiment, the sequence of actions may be performed in any order to meet the thresholds, or some primary actions may require the sequence of actions to be performed in an order while other primary actions do not require an order for their thresholds to be met, If not 224, if there are more active primary actions 240, the next active primary action is selected 242, and the method continues at step 222 using the newly selected primary action. If the user has performed the primary action 222 without performing the threshold number or numbers of actions in the sequence 222, the method continues at step 238. If the user has performed the threshold number of actions in the sequence for the selected primary action without performing the selected primary action 224, the user is notified that the selected primary action is available to be performed, and the user is offered instructions as to how to perform the selected primary action 226. The user may indicate that the offer is accepted, that the offer is not accepted, but the offer should be repeated at a later time (i.e. deferred), or that the user does not wish to accept the offer and does not wish to have the offer repeated for the primary action (i.e. rejected). If the user indicates that the user does not wish to accept the offer and does not wish to have the offer repeated for the primary action 230, the primary action is set as inactive 238, and the method continues at step 240.

If the offer is deferred 230, if a repeat counter for the primary action does not exceed a threshold, the repeat counter for the primary action is incremented, and the threshold or thresholds for the selected primary action is increased, for example by 20% 236, and the method continues at step 240. In one embodiment, the threshold for the repeat counter may be infinite, and in another embodiment, if the repeat counter for the selected primary action reaches the threshold, the option to defer is not presented to the user.

If the offer is accepted 230, instructions are provided to the user as the user steps through a series of one or more actions that make up the primary action 232. The series of actions may include moving from one web page to another, or they may include entering data into one or more fields on a single web page, or both. Other actions may be included in the series of one or more actions that make up the primary action. Thus for example, to send a message, a user may be directed to press a button on the web page being used to browse a profile of another user, and then may be instructed to fill in a subject line, then, when the user finishes writing the subject line, the user may be instructed to write the body of the message, and then, when the user has completed writing the body of the message, the user may be instructed to press a 'send' button. Each such instruction may be provided one at a time only after the prior action in the series has been completed, or started. Completion of data entry may be detected when a user tabs out of a field, or otherwise indicates that they are finished performing such data entry. The method continues at step 238.

Figure 3:
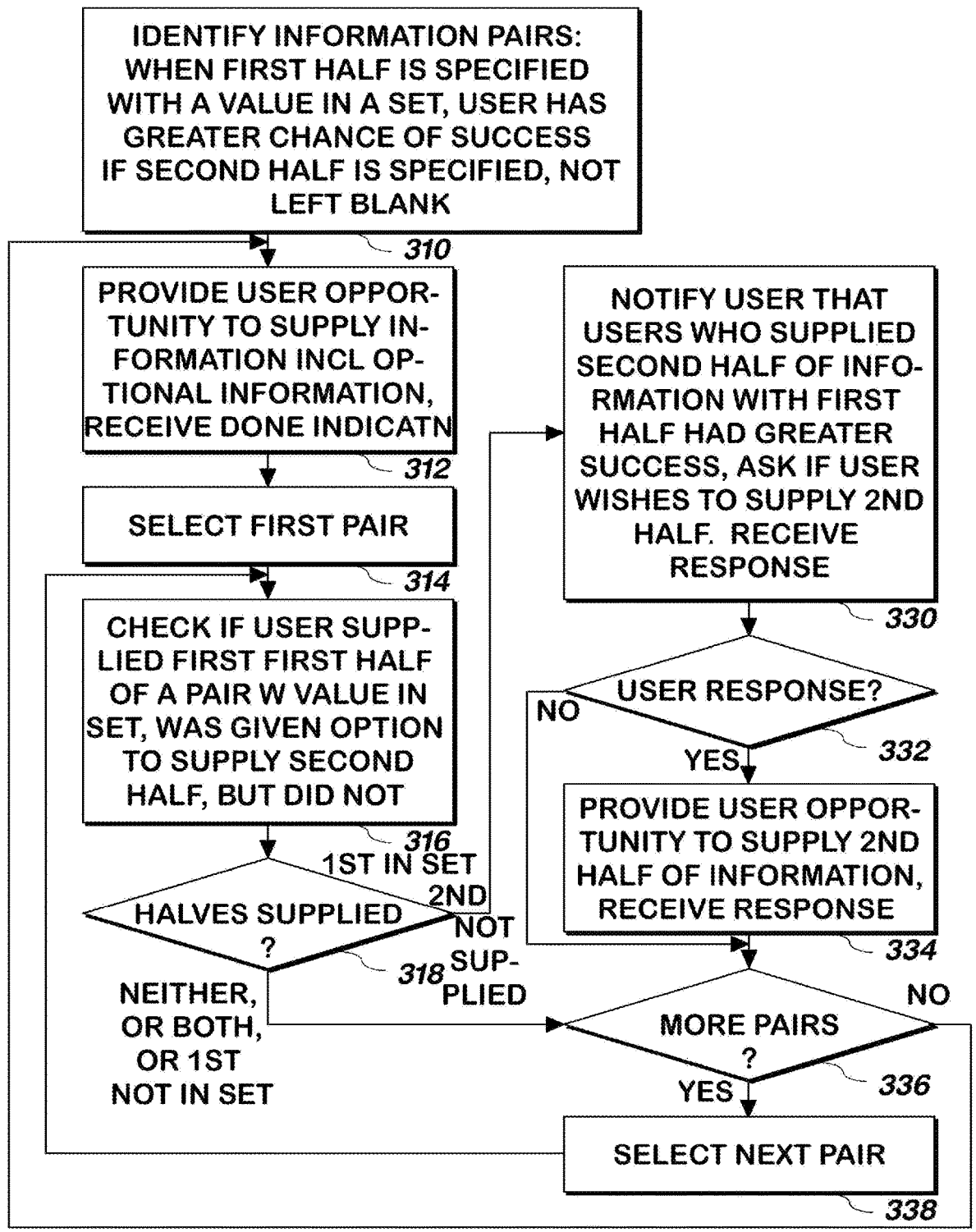
FIG. 3 is a flowchart illustrating a method of providing assistance to a user of a web site or application or other media according to one embodiment of the present invention.

Referring now to FIG. 3, a method of providing assistance to a user of a web site or application or other media is shown according to one embodiment of the present invention. Information pairs are identified 310, for example, by a system administrator. In one embodiment, an information pair is two prices of information, supplied together or separately, and when the first part of information is optionally supplied with a value in a set of one or more values, the user has greater chance of achieving a goal of theirs or the operator of the web site or the application if the user also supplies information corresponding to the second piece of the pair than if they do not supply information corresponding to the second piece of the pair. For example, in a dating web site if a user indicates that they place a high degree of importance on the education of other users, the user may have greater probability of achieving their goal or the goal of the operator of the web site or application or other media if they specify what their education level is, than if they don't specify an education level or specify the information in a non-committal manner, such as "decline to specify". In this example, the first piece of the information in the pair is the degree of importance the user indicates that education plays in their selection of another user, with possible values of high, medium or low, and the second piece of the information in the pair is the highest education level they attained. In this example, the set of values in the first piece that the user can specify that may cause the user to have greater chance of achieving a goal of theirs or the operator of the web site or application or other media if the second piece of the information is also specified is a value of "high". The two pieces of information are text based information in this example, and may be supplied as answers to questions. In one embodiment, a photo or its existence is not considered the second piece of an information pair.

In one embodiment, the first piece of the information must be specified as being within a set of at least one of the values that may be specified, but not all of the values that may be specified, to cause specification of the second piece of the information to help the user to achieve greater probability of achieving a goal of theirs or of the operator of the web site or application, namely the ability to cause other users of the web site to message that user, or to respond to messages sent by the user, either or both of which may be prerequisites of obtaining a date, another goal of a dating web site or application. In another embodiment, the first piece of information is not so limited: that is, any value specified for the first piece of information may cause the specification of the second piece of information to cause a higher probability of such a goal to be achieved. Pairs of information may be identified using conventional regression analysis on information provided by many users who have achieved one or more goals of the web site or application or achieved them more frequently, than users who have not achieved such a goal. For example, one may perform regression analysis on the users who have received the highest average number of messages and/or replies per review of their profile.

To identify an information pair, identifiers of each piece of information are provided and received, optionally along with the set of one or more values of the first piece of information in the pair that will cause answers to the second piece of the pair to increase the likelihood of achieving at least one goal of the web site or application.

It is noted that the specification of the second piece of the information with any value other than leaving it blank will assist the user in achieving at least one goal of theirs or the web site or application. In one embodiment, a specification of a noncommittal answer, such as "I do not wish to specify" is not considered to provide information, and is considered to be the same as leaving the answer blank.

Any number of one or more information pairs may be identified using the criteria specified above as part of step 310.

A user is provided with an opportunity to supply information, including optional information 312. To supply information, the user may answer a question, either with a text-based free form answer or with a multiple-choice answer. The question may be a question about the user of the web site or application or other such users, or a fictional user such as the user's ideal mate. Optional information is information that is not required to be supplied, or as noted above, may be supplied in a manner that does not answer, or fully answer the primary question the information is to answer or provide information about the primary subject of the information to be supplied. Step 312 is considered complete when the user indicates that the user is done supplying whatever, if any, information the user is going to supply at the time. Such an indication may be received when the user tabs out of a user interface element in which the information is to be supplied or otherwise enters a field below the field in which information can be supplied, or requests to move to a different page or user interface display.

When the user supplies information, the first pair of information specified in step 300 is selected 314, and a check is made as to whether the user has supplied the information from the first piece of the selected pair using a value in the set of one or more values specified, and was given an opportunity to supply the other piece but did not supply it 316. In one embodiment, all possible values are considered to be in the set of one or more values and in another embodiment, only those specified in step 310 are in such set.

If the user has supplied neither piece, or both pieces (with what is supplied in the second piece actually providing information about its primary subject, as opposed to noncommittal information, such as "decline to specify", which is treated as not having supplied the second piece of information) or the user supplied a value of the first piece that was not in the set of one or more values indicated 318, the method continues at step 336. Otherwise 318, the method continues at step 330.

At step 336, if there are more pairs, the next pair is selected 338, and the method continues at step 316 using the newly selected pair. Otherwise 336, the method continues at step 312.

At step 330 the user may be notified that other users who supplied the information in the second piece under the circumstances described herein had a higher probability of achieving at least one of the goals of theirs or the operator of the web site or application, the user may be optionally notified of such goal, the user may be asked if the user wishes to supply information corresponding to the second piece of the pair, and a response is received from the user 330. In one embodiment, the response received from the user may be implicitly received, for example if the user repeats the operation to move to a different field or page (the implicit response being "no"), or supplies or starts to supply the information in the second piece (the implicit response being "yes"). In another embodiment, the user is provided an explicit opportunity to respond. If the user affirmatively responds 332, the user's provided with an opportunity to supply the second piece of information 334, and such information may be received as part of step 334. the method continues at step 336. If the user response is negative, 332, the method continues at step 336.

It is noted that the assistance and guidance described herein may be provided at the time that the user may require it. Thus, the series of actions could end with an action in which the logical next action would be to perform the primary action. The instructions would appear at such time, to allow the user to receive instructions at a time they may be needed or desired by the user. The instructions based on pairs of information are described herein as being displayed at the time the user is about to omit the second piece of information in the pair or provide a value, thus providing such instructions at the time the user would be able to provide the second piece of information or one that isn't non-committal.

There may be several versions of messages provided to the user as instructions or notifications as described herein (e.g. at step 232 or 330), with the version provided to the user being selected at the time the instructions or notifications are provided or at another time. The version text or audio used in the messages provided to the user as described herein may be selected using conventional A-B testing to identify messages that cause the user to take the action suggested. Such versions of messages may be selected using conventional regression analysis, and/or may be selected based on weighted averages of information supplied by the user, information related to the user, or of actions taken by the user, and that of other users. For example, one version of message for a pair or a primary action may be found to work best if the user is male and has been registered for less than 4 weeks based on other similar users. The system administrator may provide input to the selection process or initial input, for example, suggesting certain messages for users having certain information, and such messages can be shown more frequently to such users than other messages, at least initially. The selection criteria may change over time based on conventional machine learning techniques or information received from the system administrator based on observations of samples of users. Such messages may be context specific, based on what the user is doing at the time, and what the user has done. For example, some or all messages may reference one or more of the pieces of information provided by the user.

In one embodiment, messages provided to the user educate the user as to how the suggestions can help the user achieve their goals in using the web site, application or other media. The messages may indicate the statistics of other users who supplied information corresponding to the suggested changes or corresponding to their currently supplied information, for example, "only 10 of users with no education level specified receive messages, but 80% of those who specify an education level receive messages."

In one embodiment, instead of recommendations based on whether the field is blank or non-committal, the recommendations are based on whether the second piece of information has or includes a certain value or option. In one embodiment, this may be performed without regard to content of a first piece of information in the pair.

In one embodiment, one of the elements of the set of information specified for the first piece of information may include a "not provided" option, such that the second piece of information triggers a recommendation if the first piece is not provided. In another embodiment, the "not provided" option may not be in the set for the first piece of information.

System.

Figure 4:
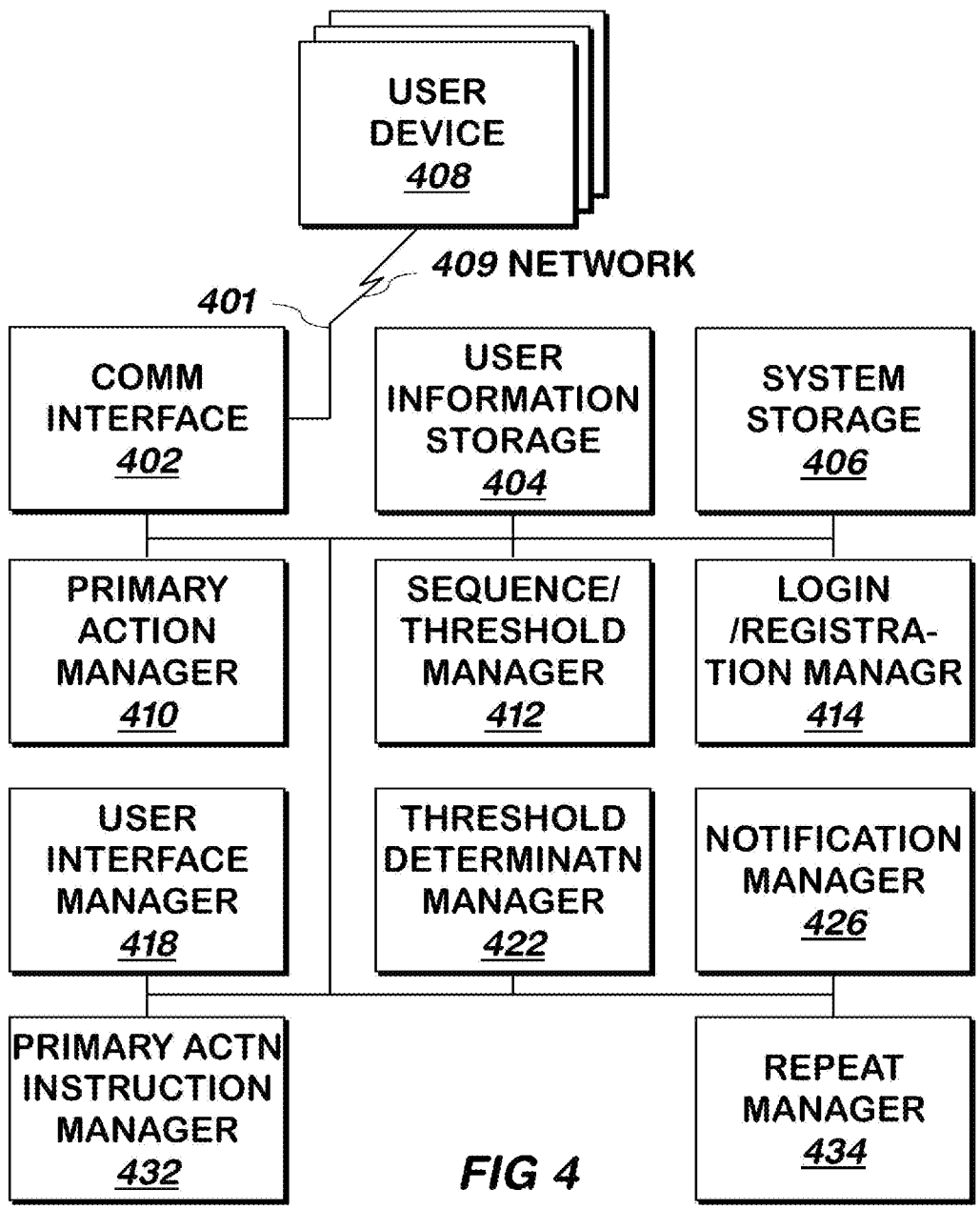
FIG. 4 is a block schematic diagram of a system for providing guidance to a user of a web site or application or other media according to one embodiment of the present invention.

Referring now to FIG. 4, a system for providing assistance to a user of a web site or application or other media is shown according to one embodiment of the present invention.

Communication interface 402 includes a conventional TCP/IP-compatible communication interface that allows elements 410-434 to communicate with user systems 408 via network 409. User systems 408 may include conventional personal computer systems, or smart devices. Network 409 includes one or more conventional networks, including Ethernet networks, networks that make up the Internet, or both.

User interface manager 418 receives a user interface including fields in which the user can supply information, and actions the user can request, and user interface manager 418 stores such fields and actions into system storage 406. In one embodiment, the user interface operates a conventional dating web site or application, though other functions may be used. A conventional dating web site allows users to describe characteristics of themselves and other users in whom they are interested, search or browse other users, message other users and respond to messages, and arrange dates via such messages, which the pair of users would then both attend. Any of these functions may be provided in the manner described herein. User interface manager 418 may assign unique identifiers to each such field and action, or the fields and actions may be received with unique identifiers, and such unique identifiers are stored associated with the fields and actions in system storage 406.

A system administrator uses primary action manager 410 to identify primary actions using the unique identifiers of each action described above. If a primary action includes several activities, each having an action identifier, the first such identifier may be used. Primary action manager 410 stores each primary action identified in system storage 406. The system administrator uses sequence/threshold manager 412 to view the primary actions stored in system storage 406, and for each primary action, identifies the sequence of two or more actions for each primary action viewed using the unique identifiers assigned to each such action, and identifies thresholds described above for each primary action viewed, and sequence/threshold manager four and 12 stores the identifiers of the actions and the sequences and the thresholds, associated with the primary action in system storage 406. For example, if the threshold number of browses of other users profiles is 25 before a message is sent to one of the user whose profiles are browsed, the identifier for the action of browsing is stored associated with the identifier of the action of sending a message, associated with the number 25 in system storage 406. There may be any number of primary actions, sequences, and thresholds identified and stored in this manner as described above.

Any number of users may each register an account using login/registration manager 414. Login/registration manager 414 receives a user identifier and a password from each user, and stores such information in user information storage 404. Login/registration manager 414 also initializes the repeat counter's for each primary action stored in system storage 406, sets thresholds for the user for each primary action by copying them from system storage 406 to user information storage 404, and sets all primary actions for the user as active, all in user information storage 404. When the user has completed registration, login/registration manager 414 stores a cookie on the user device from which the user has registered, or stores similar information into secure storage on the user device, or provides other similar information, such information including a unique session identifier which login/registration manager 414 stores associated with the user identifier in user information storage 404. Each other element may read the user identifier from such information stored on the user device as needed. Login/registration manager 414 then signals user interface manager 418.

The user may log out of, or time out of, the system of FIG. 4 (other than user device 408 and network 409), and then log back in to such system using a different session via login/registration manager 414. The user supplies a user identifier and password to login/registration manager 414, and login/registration manager 414 validates user identifier password using conventional techniques via the information stored in user information storage 404. Once logged in, the user is issued a unique session identifier by login/registration manager 414, which stores such information into user information storage 404 associated with a user identifier user, and stores the session identifier onto the user device using conventional techniques as described above. Login/registration manager 414 signals user interface manager 418.

When signaled, user interface manager 418 reads the cookie or secure storage information or other similar information on the user device and uses it to identify the user identifier he the information stored in user information storage 404. User interface manager 418 then provides the user interface stored in system storage 406 with user interface elements such as buttons or links allowing the user to perform actions on the website or via the application, and receives from the user a request to perform any action that may be performed on the website, or via a mobile device, in which case a front end to the various components of the system of FIG. 4 (other than user device 408 and network 409) may reside on the user device 408 and communicate with the system of FIG. 4 (other than user device 408 and network 409) as described herein. The front end may provide a user interface, and may perform some of the functions described herein, allowing some of the components of FIG. 4 (other than user device 408 and network 409) to reside in part on the user device 408.

As it receives a request to perform an action from the user, user interface manager 418 stores the unique identifier of the requested action associated with the user identifier of the user requesting the action to be performed in user information storage 404, optionally, along with the current date and time retrieved from an operating system (not shown). User interface manager 418 then supplies the user identifier of the user who requested the action to threshold determination manager 422. Threshold determination manager 422 selects the first active primary action, from those specified in system storage 406, stores into user information storage 404 the identifier of the selected primary action associated with the user identifier of the user, and determines whether the user has performed the actions in the sequence corresponding to the primary action and stored in system storage 406 a number of times corresponding to the threshold associated with such primary action stored for the user in user information storage 404 without performing the selected primary action. If not, threshold determination manager 422 determines if there are more unselected (for that action requested by the user) active primary actions, and if so selects the next active primary action, and repeats the process described herein using the newly selected active primary action. If there are no more active primary actions, threshold determination manager 422 signals user interface manager 418, which then allows a user interface manager 418 to receive the next subsequent request from the user, and the process described above repeats using such request as described herein.

If the user has performed or requested the primary action, for example because the action requested was the primary action, threshold determination manager 422 sets the primary action inactive for the user in user information storage 404. Setting a primary action inactive only sets that primary action inactive for one user in one embodiment of the present invention. Threshold determination manager 422 then determines if there are more primary actions and either selects a next primary action and repeats the process using the newly selected primary action as described above, or signals user interface manager 418 as described above.

If the action corresponding to the request causes the threshold of the series the selected primary action stored for the user in user information storage 404 to be met or exceeded, threshold determination manager 422 provides the user identifier of the user and identifier of the primary action selected to notification manager 426.

When it receives such information, notification manager 426 notifies the user that the selected primary action is available to be performed and offers the user instructions on how to perform the selected primary action. Such offer may be received with the user interface information or with the threshold information as described above, and stored in system storage 406. If the user rejects the offer and indicates that it should not be repeated, notification manager 426 sets the primary action for the user to be inactive in user information storage 404, and signals threshold determination manager 422 with the identifier of the user. Threshold determination manager 422 determines if there are additional primary actions that are active that have not been selected for the most recent action requested by the user, and if so, selects the next primary action and repeats the process as described herein using the newly selected primary action, and if there are no more primary actions that are active and not selected for the most recent action requested, signals user interface manager 418 as described above.

If the user defers the offer, notification manager 406 provides the identifier of the selected primary action and the user identifier to repeat manager 434. When it receives such information, repeat manager 434 increments in user information storage 404 the repeat counter for the primary action corresponding to the identifier it receives and for the user corresponding to the identifier it receives, and, as described above, increases the threshold or thresholds for the series corresponding to such primary action for the user in user information storage 404. Repeat manager 434 provides the user identifier it receives to threshold determination manager 422, and threshold determination manager 422 determines if there are additional primary actions that are active that have not been selected for the most recent action requested and if so, selects the next primary action and repeats the process as described herein using the newly selected primary action. If there are no more primary actions that are active and not selected for the most recent action requested, threshold determination manager 422 signals user interface manager 418 as described above. If the repeat counter exceeds a threshold, repeat manager 434 sets the primary action for the user to be inactive in user information storage 404, before providing such information to threshold determination manager 422.

If the user accepts the offer, notification manager 426 sets the primary action for the user to be inactive in user information storage 404 and provides the identifier of the primary action and the identifier of the user it received to primary action instruction manager 432. Primary action instruction manager 432 provides such instructions to the user in one embodiment.

For each primary action, the system administrator may provide with the primary action information described above instructions that indicate how the user can perform the primary action, and such instructions are stored in system storage 406. Other conventional manners providing instructions may be used, including a video, or specially designed user interfaces that appear identical to the user interface the user will use to perform the primary action without the instructions, but also contain instructions displayed on the display screen and at the location of the user interface control the user would be used to perform the primary action.

In one embodiment, user interfaces used with all primary actions contain a software flag for each primary action that acts as a switch that allows the display of the instructions with the user interface controls. In such embodiment, primary action instruction manager 432 sets the flag for the user and the primary action in user information storage 404 to indicate that the instructions should be displayed to the user, and signals user interface manager 418 to redisplay the currently displayed user interface. User interface manager 418 checks the flags as it displays its various user interface elements to the user, and if a flag is set, displays instructions corresponding to such flag as the user encounters the user interfaces associated with the various primary actions. Such an arrangement is provided by the system administrator to user interface manager 418 along with the user interfaces that are displayed to the user in the normal course of operation. Once the user has completed performing the primary action associated with the flag, or aborts performing the activities of the primary action and uses a user interface control to perform a different primary action, user interface manager 418 clears the flag for the primary action and the user in user information storage 404.

In one embodiment, when the user accepts the offer, no additional checks for providing instructions for other primary actions are performed for the request for the action that triggered the instructions to be delivered. In such embodiment, user interface manager 418 could simply receive the next request from the user. In another embodiment, such checks are performed, in which case user interface manager 418 signals threshold determination manager 422, with the identifier of the user that it retrieves from the cookie or secure storage, and threshold determination manager 422 identifies the currently selected primary action stored for the user in user information storage 404. Threshold determination manager 422 determines if there are additional primary actions that are active that have not been selected for the most recent action requested, and if so selects the next primary action and repeats the process as described herein using the newly selected primary action, and if there are no more primary actions that are active and not selected for the most recent action requested, signals user interface manager 418 as described above.

Figure 5:
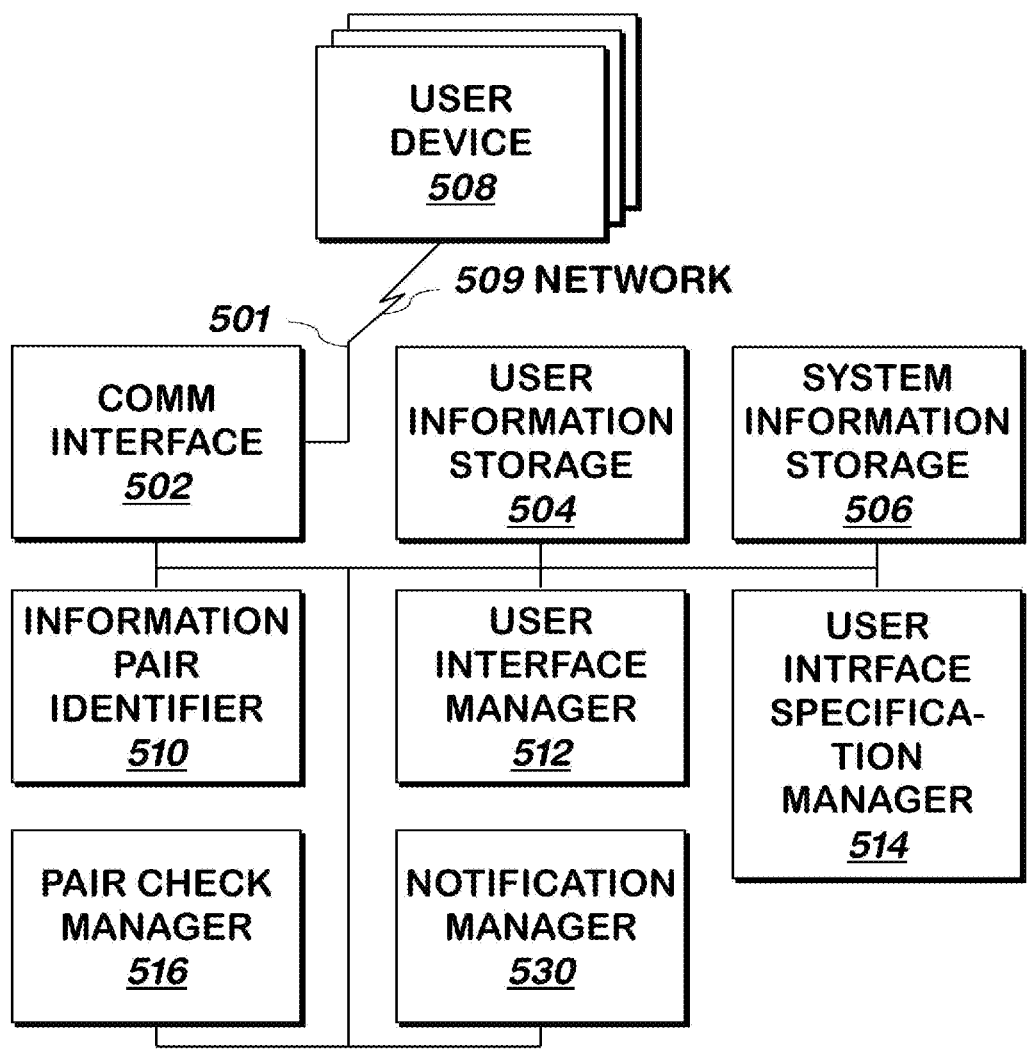
FIG. 5 is a block schematic diagram of a system for providing assistance to a user of a web site or application or other media according to one embodiment of the present invention.

Referring now to FIG. 5, a system for providing assistance to a user of a website or an application or other media is shown according to one embodiment of the present invention.

Communication interface 502 includes a conventional TCP/IP-compatible communication interface that allows elements 510-530 to communicate with user systems 508 via network 509. User systems 508 may include conventional personal computer systems, or smart devices. Network 509 includes one or more conventional networks, including Ethernet networks, networks that make up the Internet, or both.

The system of FIG. 5 may be part of the same system of FIG. 4, sharing communication facilities and user devices, for example.

User interface specification manager 514 receives a user interface specification, including fields in which a user enters information, such as information about that user, or about other users that a user would prefer to meet, and stores such information into system information storage 506. In one embodiment, user interface specification manager 514 assigns a unique identifier to each field received as part of the user interface specification, and stores the field identifier, associated with the field, in system information storage 506. In another embodiment, user interface manager 514 receives such unique identifiers with the fields and stores them into system information storage 506.

Information pair identifier 510 receives the identifiers of each information pair as described above, and optionally the set of one or more values for the first piece of information in the pair, as described above. Information pair identifier 510 stores such information into system information storage 506. Any number of one or more information pairs may be specified in this manner. Such information may be received and updated by the system administrator at any time, or may be automatically identified and updated, by checking results such as messages received against various pairs and values of information in the pairs.

User interface manager 512 provides to a user of a website or an application the user interface specified in system information storage 506, and allows the user the opportunity to include information in the fields specified as part of the user interface. As noted above, some of the fields of information may be optionally filled in, so that the user may leave them blank if desired, and some of the fields of information may be specified in a manner that is non-committal as indicated above. If the user enters information into a field, user interface manager 512 stores the information and the field identifier for such field into user information storage 504, associated with the user identifier of the user. In one embodiment, the user identifier may be received by user interface manager 512 from a cookie, or secure storage, or the user may register with user interface manager 512, or log in with user interface manager 512, and such user identifier is provided or received as described above by user interface manager 512 using conventional techniques, and, upon registration, is stored into user information storage 504. If a field is displayed to a user, but no information is received from the user, user interface manager 512 stores into user information storage 504 associated with user identifier, an indication that the field was displayed to the user but that the user did not provide any information.

Each time a user indicates that they are done with a field, either by entering a field below such field, or by pressing a button or other user interface control indicating that the user is done with one or more fields on the page or portion of the user interface being viewed, user interface manager 512 provides all of the identifiers of all such fields to pair check manager 516, which selects the first identifier of any such fields.

Pair check manager 516 selects the first information pair stored in system information storage 506, and checks to see if the user: A) supplied a value for the first piece of information in the selected pair that was in the set of information associated with such pair, and B) was given the option to supply information for the second piece of the selected pair (or was supplied in any value if the set includes all possible values), but either: 1) did not supply, or 2) supplied a noncommittal version of, such information. In one embodiment, a noncommittal version of such information is one of several options that may be supplied as the second piece of information, such as a multiple choice answer that is supplied in a question and answer format. The various choices may be supplied to, and stored by, user interface specification manager 514 with the fields described above, and noncommittal choices may be marked by the system administrator using as such to allow pair check manager 516 to make this determination. User interface specification manager 514 may receive and store in system storage 506 words used in non-committal information, and pair check manager 516 may scan the information received for such words to determine that non-committal information has been provided.

Pair check manager 516 may use the indication that the field was displayed to the user but that the user did not supply any information described above to determine if the user was given the opportunity to provide the second piece of information in the selected pair, but did not provide it. In one embodiment, the set of information of a multiple-choice answer specifies the answers that are to be considered in the set, and pair check manager 516 identifies whether the first piece of information contained in a multiple-choice answer was specified as being in the set.

If pair check manager 516 determines that neither piece of information in the selected pair, or both pieces of information in the selected pair, were provided by the user, or that the user supplied the first piece of information that was not in the set of information for the selected pair, pair check manager 516 identifies if there are more pairs in system information storage 506, and if so, selects the next pair and repeats the process for the newly selected pair as described herein.

If the second piece of information in the selected pair was not provided by the user, but the user provided the first piece of information, optionally in a manner that placed it in the set of information, pair check manager 516 signals notification manager 530 with the identifier of the field of information being checked, and a unique identifier of the pair, and notification manager 530 supplies to the user a message that is received with the pair and stored with the pair in system information storage 506 that indicates that users who supplied the second piece of information together with the first piece of information had a higher probability of meeting a goal of their or the operator of the web site or application, and reminds the user to supply the second piece of information. In one embodiment, such message is supplied by notification manager 530 in an area nearby the field in which the user could supply the second piece of information.

If there were more fields for which the user indicated being done as described above, the next such field is selected by pair check manager 516, and the process of checking the field against field pairs and processing such checking as described above is repeated for the newly selected field indicated as being done. If there are no more such fields, pair check manager 516 signals user-interface manager 512. If the user had requested a new page, or different user interface display, user interface manager 512 waits to receive the signal from pair check manager 516 before fulfilling such request in one embodiment, and then fulfils the request. In this manner, one or more messages may be displayed to the user to remind the user to supply the second piece of information displayed on the user interface for any pair.

In one embodiment, recommendations and suggestions described herein are enforced, meaning the user must comply to proceed. In the system descriptions below, the entity making the recommendation checks for compliance and re recommends if the user does not comply. Either or both user interface managers 418 and/or 512 will not allow the user to perform other functions until the user complies with the messages provided in one embodiment.

In one embodiment, the messages may be turned off by the user so that they will not appear and no checks to determine if such messages should be made will be performed for such user who so indicates. In such embodiment, either or both user interface managers 418 and/or 512 may supply a user interface to allow the messages to be turned off and when the user uses the user interface to turn the messages off, either or both user interface managers 418 and/or 512 will not initiate the checking for and providing of messages as described herein.

In one embodiment, the messaging features of the present invention may be turned on or off by the amount of time since the user first registered to the web site, application or other media. In such embodiment, login/registration manager 414 or user interface manager 512 or both record the date of the user's registration in user information storage 404 or 504. Either or both user interface managers 418 and/or 512 subtract the current date retrieved from a system clock of an operating system (not shown) and then only initiate the process that check to determine whether messages should be provided to the user if the difference is above or below a threshold, or between or outside of, two thresholds. In one embodiment, certain requirements to send messages may be relaxed or eliminated based on these same triggers, so, for example, messages may be provided to a user if the user has not provided the second piece of information, even if the first piece of information is not in the corresponding set, after a threshold amount of time has elapsed from the date of the user's registration.

SUMMARY

Described herein is a method of providing instructions regarding performing a primary action, including: identifying a threshold number of two or more other actions, each other action different from the primary action, the threshold corresponding to a statistic concerning a number of times other users who performed the primary action performed at least one of the other actions in the two or more before the first time such other users performed the primary action for their respective first time; monitoring via a computer system including a hardware processor system coupled to a memory system, a number of times a user who has not yet performed the primary action has performed the at least one of the other actions; and responsive to the number of times the user who has not yet performed the primary action had performed the at least one of the other actions meeting or exceeding the threshold, performing at least one selected from a set of actions including: informing the user of an existence of the primary action; offering instructions to the user regarding how to perform the primary action; and providing instructions to the user regarding how to perform the primary action.

The method includes an optional feature whereby the statistic includes a percentile.

The method includes an optional feature whereby the monitoring is performed across multiple sessions, each session corresponding to an identification of the user to a computer system for the purpose of receiving access to that computer system.

The method includes an optional feature whereby the other users include a subset of all users of a website who meet at least one criteria indicating success of the user or of an operator of the website.

The method includes an optional feature whereby the two or more other actions are identified responsive to a type of the user.

The method includes an optional feature whereby: the two or more other actions include a sequence of other actions; the threshold is responsive to other users performing in the sequence the two or more other actions; and the monitoring step is responsive to the user performing in the sequence the at least one of the other actions.

The method includes an optional feature whereby the performing at least one selected from the set of actions includes providing the instructions, said instructions including a sequence of instructions regarding two or more steps in performing the primary action.

Described herein is a system for providing instructions regarding performing a primary action, including: a threshold determination manager having an input coupled to receive an indication of each of two or more actions performed by each of two or more users and an identifier of the user in the two or more who performed each action, and for receiving a threshold corresponding to a statistic concerning a number of times other users who performed the primary action performed at least one other action in two or more other actions before the first time such other users performed the primary action for their respective first time, the threshold determination manager for identifying a number of times a user who has not yet performed the primary action has performed the at least one of two or more other actions, each other action different from the primary action, and each other action and the primary action being a portion, but not all, of the two or more actions performed by the user, and for, responsive to the number of times the user who has not yet performed the primary action had performed at least one of the other actions in the two or more other actions meeting or exceeding the threshold number of times, providing a signal at an output that identifies the user; and a primary action instruction manager having an input coupled to the threshold determination manager output for receiving the signal, the primary action instruction manager for providing at an output to the user at least one selected from a set including: information about an existence of the primary action; an offer of instructions regarding how to perform the primary action; and instructions regarding how to perform the primary action.

The system includes an optional feature whereby the statistic includes a percentile.

The system includes an optional feature whereby the two or more actions are performed across multiple sessions, each session corresponding to an identification of the user to a computer system for the purpose of receiving access to that computer system.

The system includes an optional feature whereby the other users include a subset of all users of a website who meet at least one criteria indicating success of the user or of an operator of the website.

The system includes an optional feature whereby the two or more other actions is identified responsive to a type of the user.

The system includes an optional feature whereby: the two or more other actions include a sequence of other actions; the threshold is responsive to other users performing in the sequence the two or more other actions; and the monitoring step is responsive to the user performing in the sequence the at least one of the other actions.

The system includes an optional feature whereby the primary action instruction manager provides at the primary action instruction manager output the instructions regarding how to perform the primary action, including a sequence of instructions regarding two or more steps in performing the primary action.

Described herein is a computer program product including a non-transitory computer useable medium having computer readable program code embodied therein for providing instructions regarding performing a primary action, the computer program product including computer readable program code devices configured to cause a computer system to: identify a threshold number of two or more other actions, each other action different from the primary action, the threshold corresponding to a statistic concerning a number of times other users who performed the primary action performed at least one of the other actions in the two or more before the first time such other users performed the primary action for their respective first time; monitor via a computer system including a hardware processor system coupled to a memory system, a number of times a user who has not yet performed the primary action has performed the at least one of the other actions; and responsive to the number of times the user who has not yet performed the primary action had performed the at least one of the other actions meeting or exceeding the threshold, perform at least one selected from a set of actions including: informing the user of an existence of the primary action; offering instructions to the user regarding how to perform the primary action; and providing instructions to the user regarding how to perform the primary action.

The computer program product includes an optional feature whereby the statistic includes a percentile.

The computer program product includes an optional feature whereby the computer readable program code devices configured to cause the computer system to monitor perform said monitoring across multiple sessions, each session corresponding to an identification of the user to a computer system for the purpose of receiving access to that computer system.

The computer program product includes an optional feature whereby the other users include a subset of all users of a website who meet at least one criteria indicating success of the user or of an operator of the website.

The computer program product includes an optional feature whereby the two or more other actions is identified responsive to a type of the user.

The computer program product includes an optional feature whereby: the two or more other actions include a sequence of other actions; the threshold is responsive to other users performing in the sequence the two or more other actions; and the computer readable program code devices configured to cause the computer system to monitoring are responsive to the user performing in the sequence the at least one of the other actions.

The computer program product includes an optional feature whereby the computer readable program code devices configured to cause the computer system to perform at least one selected from the set of actions include computer readable program code devices configured to cause the computer system to provide the instructions, said instructions including a sequence of instructions regarding two or more steps in performing the primary action.

What is claimed is:

1. A method of making recommendations to a user, comprising:
    identifying, for each of at least one first piece of information, a first set of at least one value of said piece of information and a second piece of information, wherein a first subset of a plurality of other users who supplied a value in the first set for the first piece of information and who supplied a value in a second set of at least one value for the second piece of information had a higher probability of achieving a goal than a second subset of the plurality of other users who supplied the value in the first set for the first piece of information but did not supply the value in the second set for the second piece of information;
    monitoring, via a computer system comprising a hardware processor coupled to a memory, values of pieces of information provided by the user;
    for each of the values of at least some of the pieces of information provided:
        determining whether said piece of information is one of the at least one first piece of information, and if said piece of information is one of the at least one first piece of information, determining whether the value of said piece of information is in the first set of values;
        if said piece of information is one of the at least one first piece of information and the value of said piece of information is in the first set of values, determining whether a value of the second piece of information optionally supplied by the user is in the second set after the user is given an opportunity to supply such second piece of information;
        responsive to the value of the first piece of information in the first set and the value of the second piece of information not in the second set:
            informing the user that the user will have a greater chance of success towards the goal if the user supplies a value of the second piece of information in the second set; and
            prompting the user to supply the second piece of information; and
        responsive to the value of the piece of information not in the first set, or the value of the piece of information in the first set and the value of the second piece of information in the second set, not informing the user that the user will have a greater chance of success towards the goal if the user supplies a value of the second piece of information in the second set.

2. The method of claim 1, wherein the second set of at least one value includes all possible user-supplied values, such that only a response that does not include any value is not in the second set.

3. The method of claim 1, wherein the second set of at least one value excludes a non-committal value.

4. The method of claim 1, wherein each second piece of information is text based.

5. The method of claim 1, wherein informing the user comprises providing statistics regarding the achieving of the goal for at least one of the subsets.

6. The method of claim 1, wherein informing the user comprises providing statistics regarding the achieving of the goal for both of the subsets.

7. A system for making recommendations to a user, comprising:
    an information pair identifier having an input for receiving, for each of at least one first piece of information, a first set of at least one value of said piece of information and a second piece of information, wherein a first subset of the plurality of other users who supplied a value in the first set for the first piece of information and who supplied a value in a second set of at least one value for the second piece of information had a higher probability of achieving a goal than a second subset of the plurality of other users who supplied a value in the first set for the first piece of information but did not supply a value in the second set for the second piece of information, the information pair identifier for providing at an output the first set of at least one value and an identifier of the second piece of information for each of the at least one first piece of information;
    a pair check manager comprising a hardware processor coupled to a memory and having an input coupled to the information pair identifier output for receiving the first set of at least one value and the identifier of the second piece of information for each of the at least one first piece of information, for monitoring, values of pieces of information provided by the user, the pair check manager for, for each of the values of at least some of the pieces of information provided:
        determining whether said piece of information is one of the at least one first piece of information, and if said piece of information is one of the at least one first piece of information, determining whether the value of said piece of information is in the first set of values;
        if said piece of information is one of the at least one first piece of information and the value of said piece of information is in the first set of values, determining whether a value of the second piece of information optionally supplied by the user is in the second set after the user is given an opportunity to supply such second piece of information; and
        providing at an output an indicator having a first state responsive to the value of the first piece of information in the first set and the value of the second piece of information not in the second set and a second state responsive to the value of the piece of information not in the first set, or the value of the first piece of information in the first set and the value of the second piece of information in the second set;

a notification manager having an input coupled to the pair check manager output for receiving the indicator, the notification manager for:

responsive to the indicator having the first state:

informing the user that the user will have a greater chance of success towards the goal if the user supplies a value of the second piece of information in the second set; and prompting the user to supply the second piece of information; and responsive to the indicator having the second state, not informing the user that the user will have a greater chance of success towards the goal if the user supplies a value of the second piece of information in the second set.

8. The system of claim 7, wherein the second set of at least one value includes all possible user-supplied values, such that only a response that does not include any value is not in the second set.

9. The system of claim 7 wherein the second set of at least one value excludes a non-committal value.

10. The system of claim 7, wherein each corresponding piece of information is text based.

11. The system of claim 7, wherein informing the user comprises providing statistics regarding the achieving of the goal for at least one of the subsets.

12. The system of claim 7, wherein informing the user comprises providing statistics regarding the achieving of the goal for both of the subsets.

13. A computer program product comprising a non-transitory computer useable medium having computer readable program code embodied therein for of making recommendations to a user, the computer program product comprising computer readable program code devices configured to cause a computer system to:

identify, for each of at least one first piece of information, a first set of at least one value of said piece of information and a second piece of information, wherein a first subset of a plurality of other users who supplied a value in the first set for the first piece of information and who supplied a value in a second set of at least one value for the second piece of information had a higher probability of achieving a goal than a second subset of the plurality of other users who supplied the value in the first set for the first piece of information but did not supply the value in the second set for the second piece of information;

monitor values of pieces of information provided by the user;

for each of the values of at least some of the pieces of information provided:

determine whether said piece of information is one of the at least one first piece of information, and if said piece of information is one of the at least one first piece of information, determining whether the value of said piece of information is in the first set of values;

if said piece of information is one of the at least one first piece of information and the value of said piece of information is in the first set of values, determine whether a value of the second piece of information optionally supplied by the user is in the second set after the user is given an opportunity to supply such second piece of information;

responsive to the value of the first piece of information in the first set and the value of the second piece of information not in the second set:

inform the user that the user will have a greater chance of success towards the goal if the user supplies a value of the second piece of information in the second set; and prompt the user to supply the second piece of information; and responsive to the value of the piece of information not in the first set, or the value of the piece of information in the first set and the value of the second piece of information in the second set, not inform the user that the user will have a greater chance of success towards the goal if the user supplies a value of the second piece of information in the second set.

14. The computer program product of claim 13, wherein the second set of at least one value includes all possible user-supplied values, such that only a response that does not include any value is not in the second set.

15. The computer program product of claim 13, wherein the second set of at least one value excludes a non-committal value.

16. The computer program product of claim 13, wherein each second piece of information is text based.

17. The computer program product of claim 13, wherein the computer readable program code devices configured to cause the computer system to inform the user comprise computer readable program code devices configured to cause the computer system to provide statistics regarding the achieving of the goal for at least one of the subsets.

18. The computer program product of claim 13, wherein the computer program product comprising computer readable program code devices configured to cause the computer system to inform the user comprise computer readable program code devices configured to cause the computer system to provide statistics regarding the achieving of the goal for both of the subsets.

* * * * *